Figure 1A:
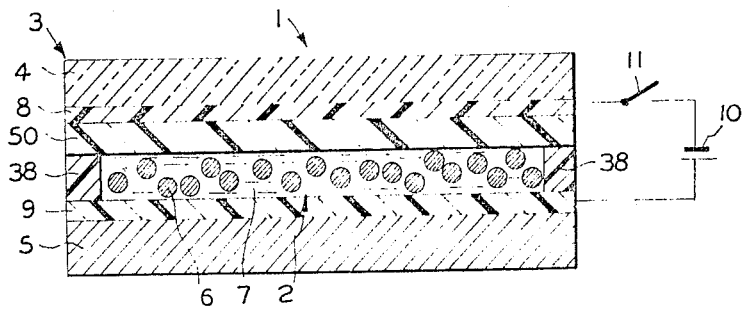

Ota

[11] 3,767,392
[45] Oct. 23, 1973

[54] ELECTROPHORETIC LIGHT IMAGE REPRODUCTION PROCESS

[75] Inventor: Isao Ota, Osaka, Japan

[73] Assignee: Matsushita Electric Industrial Co., Ltd., Kadoma, Osaka, Japan

[22] Filed: Apr. 15, 1970

[21] Appl. No.: 28,587

[52] U.S. Cl............................ 96/1 R, 96/1.2, 96/1.3, 96/1.5, 204/181 PE
[51] Int. Cl. .................... G03g 5/00, G03g 13/00
[58] Field of Search .................... 96/1, 1.2, 1.5, 1.3; 204/181 PE

[56] References Cited
UNITED STATES PATENTS

| | | | |
|---|---|---|---|
| 3,511,651 | 5/1970 | Rosenberg | 96/1 |
| 3,438,706 | 4/1969 | Fanaka et al. | 96/1 UX |
| 3,510,419 | 5/1970 | Carreira et al. | 96/1.5 X |
| 3,515,880 | 6/1970 | Letter | 96/1.5 X |
| 3,436,215 | 4/1969 | Lavinos et al. | 96/1 |
| 3,393,617 | 7/1968 | Gaynor | 96/1.5 X |
| 3,453,106 | 7/1969 | Teague | 96/1.5 |

Primary Examiner—Norman G. Torchin
Assistant Examiner—John R. Miller
Attorney—Wenderoth, Lind and Ponack

[57] ABSTRACT

Electrophoretic light image reproduction process is disclosed in which a D.C. voltage is applied to a double layer of a photoconductive layer and an electrophoretic suspension layer including a dispersion of at least one electrophoretic material in a finely divided powder form suspended in a suspending medium, whereby said D.C. voltage changes the optical reflective property of said electrophoretic suspension layer due to electrophoretic movement of said electrophoretic material, said photoconductive layer is exposed to a light image so that the light-struck area has a low electrical resistance, an electric field is applied to said double layer having said electrophoretic suspension layer changed in the optical reflective property and having said photoconductive layer lowered in the electrical resistance at the light-struck area, whereby said electrophoretic material at said light-struck area moves electrophoretically and reproduces said light image on said electrophoretic suspension layer.

18 Claims, 12 Drawing Figures

INVENTOR
ISAO OTA

INVENTOR
ISAO OTA

INVENTOR
ISAO OTA

ELECTROPHORETIC LIGHT IMAGE REPRODUCTION PROCESS

BACKGROUND OF THE INVENTION

Many systems are known today for display or recording of light image. For example, a double layer of photoconductive layer and an electroluminescent layer can be used so as to produce an electric flat panel display device for displaying light image reversibly. But it suffers from one shortcoming or another. For example, the device can not display sufficiently bright image because of inferiority in luminescent efficiency of the electroluminescent layer. It can not store or record the displayed image. An electron tube such as image tube, Noctovision or X-ray image intensifier is known as a device for converting input infrared light image or X-ray image into visible image or for amplifying input dark image into bright image but an electron tube is difficult to produce so that it has a flat panel or so that it has a large size.

In order to record an input light image, photographic systems such as, for example, silver salt photography, electrophotography or diazo photography are today in wide spread use but those systems suffer from one shortcoming or another in cost, process time, photographic speed or spectral sensitivity.

SUMMARY OF THE INVENTION

This invention relates to a light image reproduction process and particularly to an electrophoretic light image reproduction process.

Other objects and advantages of this invention will be apparent from the following description, the accompanying drawings and appended claims.

An electrophoretic light image reproduction process of this invention comprises applying a D.C. voltage to a double layer of a photoconductive layer and an electrophoretic suspension layer including a dispersion of at least one electrophoretic material in a finely divided powder form suspending in a suspending medium, whereby said D.C. voltage changes the optical reflective property of said electrophoretic suspension layer due to electrophoretic movement of said electrophoretic material. The photoconductive layer is exposed to a light image so that the light-struck area has a low electrical resistance, an electric field is applied to said double layer having said electrophoretic suspension layer changed in the optical reflective property and having said photoconductive layer lowered in the electrical resistance at the light-struck area, whereby said electrophoretic material at said light-struck area moves electrophoretically and reproduces said light image on said electrophoretic suspension layer.

Referring to FIG. 1, reference character 1 designates, as a whole, an electrophoretic light image reproduction panel of this invention. A housing 3 has a frame 38 and encloses an electrophoretic suspension layer 2. The housing 3 has two opposite major housing walls 4 and 5. One of the two housing walls, for example, a housing wall 4 is transparent with respect to light image and another housing wall 5 is transparent with respect to visible light. Two electrodes 8 and 9 are adhered to inner surfaces of said two opposite major housing walls 4 and 5, respectively. Said electrode 8 is transparent with respect to light image and has a photoconductive layer 50 attached thereto. Said electrode 9 is transparent with respect to visible light. An electrophoretic suspension layer 2 is interposed between the photoconductive layer 50 and the electrode 9.

Said two electrodes 8 and 9 can have an electric field applied therebetween from a voltage source 10 through a switching device 11. Said electrophoretic suspension layer 2 includes at least one electrophoretic material 6 in a finely divided powder form suspended in a suspending medium 7. The particles of the material 6 are shown greatly enlarged in this and subsequent figures for clarity of illustration.

Figure 1B:
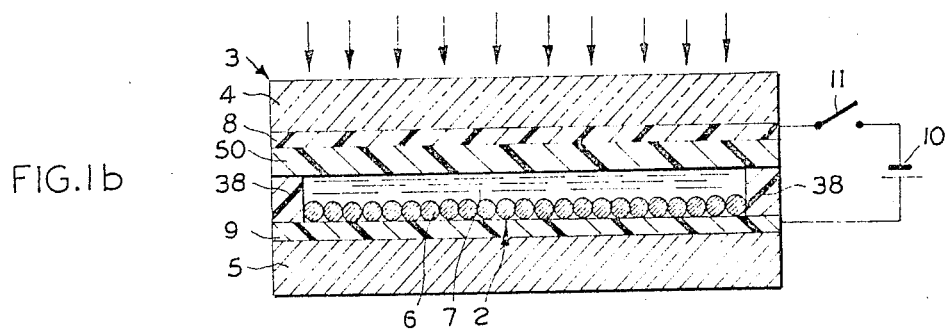

When said electrophoretic material 6 is uniformly distributed throughout said suspending medium 7 as shown in FIG. 1a, the electrophoretic suspension layer 2 has a color which is a mixture of the colors of said electrophoretic material 6 and the suspending medium 7. For example, when the electrophoretic material 6 is white and the suspending medium 7 is colored black, the electrophoretic suspension layer 2 has a gray mixed color at the electrode 9 under illumination of white light. When said photoconductive layer 50 is exposed to light, the photoconductive layer 50 has reduced resistivity at the light-struck area. When a D.C. electric field is applied across said two electrodes 8 and 9 while said photoconductive layer 50 is being exposed, at the whole surface, to light, said electrophoretic material 6 in the suspension layer 2 moves electrophoretically toward an electrode 8 or an electrode 9 depending upon the polarities of said electrophoretic material 6 and applied electric field. When said electrophoretic material 6 is, for example, positively charged in said suspending medium 7 and said two electrodes 8 and 9 are an anode and a cathode, respectively, the electrophoretic material 6 moves electrophoretically to and is deposited on an electrode 9 and shows a spatial distribution as shown in FIG. 1b. Variation in a spatial distribution of said electrophoretic material 6 results in a change of an optical reflective property of said electrophoretic suspension layer 2. This is because the layer of the electrophoretic material 6 deposited on the electorde 9 hides the layer of the colored suspending medium 7 from sight. When the layer of the white material 6 deposited on the electrode 9 hides the black colored suspending medium 7 completely, the panel 1 is white at the electrode 9 under illumination of white light. The electrophoretic material 6 deposited on a solid surface by electrophoresis can stay on the surface even after removal of applied electric field. This means that an image reproduction device of the present invention can memorize the reproduced image without using a further electric power.

Figure 1C:
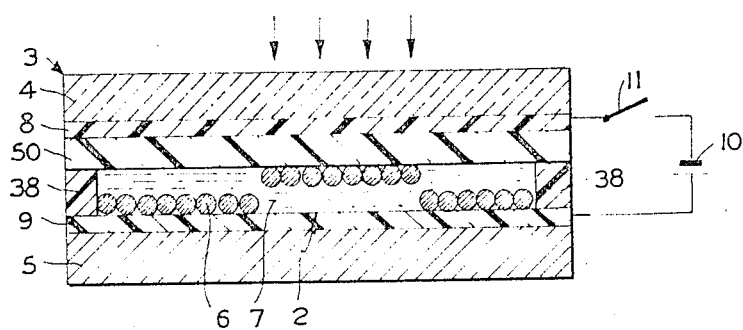

A light image is projected to said photoconductive layer 50 through the housing wall 4 so that the light-struck area has a low electrical resistance. A reverse D.C. voltage is applied between the two electrodes 8 and 9 so as to apply a reverse electric field to the double layer having said electrophoretic suspension layer 2 changed in the optical reflective property and having said photoconductive layer lowered in the electrical resistance at the light-struck area. The electrophoretic material 6 corresponding to the light-struck area is selectively subjected to the strong reverse field and moves electrophoretically to and is deposited on the surface of the photoconductive layer 50 as shown in FIG. 1c. The panel 1 shows a reproduced negative image at the electrode 9. Said reverse D.C. voltage is applied between said two electrodes until the image is reproduced. The reproduced image can stay even after removal of applied electric field.

When the first D.C. voltage is applied between the two electrodes 8 and 9 as a cathode and an anode respectively so as to make the color of the suspension layer 2 black at the electrode 9 and then the second reverse D.C. voltage is applied between the two electrodes 8 and 9 while the photoconductive layer 50 is being exposed to light image, a positive image can be reproduced at the electrode 9.

Thus, whether positive or negative image is reproduced at the electrode 9 can be easily selected by selecting the polarities of applied D.C. voltages. The change of the optical reflective property of the suspension layer 2 depends upon the length of time of application and the strength of an electric field applied thereto. A field strength in the suspension layer depends upon light strength projected on the photoconductive layer 50 and decides the color at the area of the reproduced image. Thus, the reproduced image can have halftone. The halftone corresponds to the color of the suspension area having a weak reverse D.C. field applied thereto and consists of a color which is a mixture of the colors of the electrophoretic material 6 and the suspending medium 7.

Said reverse D.C. voltage for reproducing a visible image in FIG. 1c can be replaced by an A.C. voltage. Application of an A.C. voltage to the double layer having said electrophoretic suspension layer changed in the optical reflective property at the whole surface and having said photoconductive layer lowered in the electrical resistance at the light-struck area can reproduce an image on the suspension layer.

The reproduced image has a mixed gray color at the light-struck area.

When the first D.C. voltage for changing the color of the suspension layer at the whole surface applied between said two electrodes 8 and 9 in FIG. 1b is high enough for electrophoretic movement of the electrophoretic material 6, it is not always necessary to reduce the resistivity of the photoconductive layer 50 upon irradiation of light.

Figure 1D:
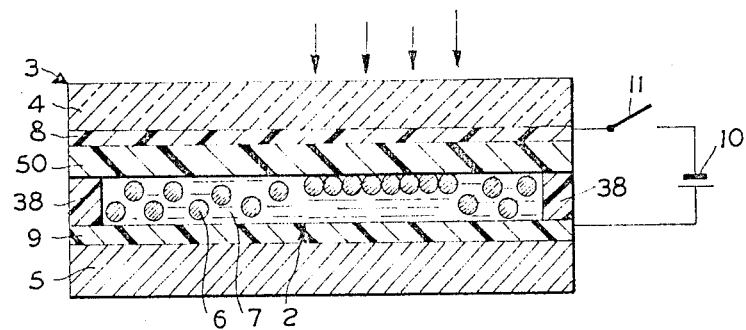

Referring to FIG. 1d, a D.C. voltage is directly applied to a double layer which comprises an electrophoretic suspension layer 2 having a uniform distribution of the electrophoretic material 6 while the photoconductive layer 50 has a reduced resistivity at the light-struck area, whereby the image can be reproduced at the electrode 9. But the reproduced image has a poor contrast compared to the image of this invention which is reproduced by applying a second reverse D.C. voltage to a double layer having the electrophoretic suspension layer changed in the optical reflective property by application of a first D.C. voltage and having the photoconductive layer lowered in the resistivity at the light-struck area.

The reproduced image at the electrode 9 can be easily erased by applying a D.C. or A.C. voltage between said two electrodes 8 and 9 from a voltage source 10 while said photoconductive layer 50 is being exposed, at the whole surface, to the light. The device 1 can thus be reused. When a high D.C. or A.C. voltage is applied between said two electrodes 8 and 9 so as to erase the reproduced image, it is not always necessary to expose the photoconductive layer 50 to light during application of said voltage for erasure.

A housing 3 for use in the device according to the present invention can be prepared by using any available material which is inert to the suspending medium and electrophoretic material. For example, a plastic sheet having a major center part cut off can be used for the frame 38 of the housing 3 as shown in FIG. 1a.

One of two opposite major housing walls can be prepared by adhering, to the frame 38, a visible light transparent plate 5 having a visible light transparent electrode 9 formed thereon. An operable plate is a transparent glass plate having a transparent thin film of tin oxide ($SnO_2$) of cuprous iodine ($CuI$) formed thereon or a transparent plastic sheet such as polyester, cellulose acetate, polyethylene or cellophane having a transparent thin film of cuprous iodine ($CuI$). Another of two opposite major housing walls can be prepared by adhering, to the frame 38, a light transparent plate 4 having a light transparent electrode 8 and a photoconductive layer 50 integrated thereon. An operable plate is a light transparent glass plate or plastic sheet as described above having a light transparent thin film of tin oxide ($SnO_2$) or cuprous iodine ($CuI$) and a photoconductive layer 50 thereon.

Said photoconductive layer 50 can be composed of any suitable and available photoconductive material which has an electrical resistance varying with irradiation of light.

Photoconductive material which will be operable is selenium, cadmium sulfide, cadmium selenide, zinc oxide, lead oxide, antimony trisulfide, anthracene, poly-N-vinyl-carbasol and its derivatives. It is possible for said photoconductive layer 50 to be crystal plate, vacuum evaporated layer, sintered layer, organic photoconductive coating or dispersion layer including photoconductive material powders dispersed in glass or resin.

The light referred to herein is defined as visible light, infrared light, ultraviolet light, X ray or $\gamma$-ray. When input light image is invisible, the image reproduction device of the present invention can act as an image converter.

It is preferred that said photoconductive layer 50 has an electrical resistance higher than that of the electrophoretic suspension layer 2 under irradiation of no light and lower than that of the electrophoretic suspension layer 2 under irradiation of strong light.

The suspending medium 7 can be prepared so as to have the desired color by dissolving a colored substance such as a dye in a colorless liquid or by suspending electrically neutral colored particles such as dyes or pigments in a colorless liquid. For example, deep blue colored suspending medium can be prepared by dissolving oil black dyes in ethyl acetate or kerosene. Violet, brown or green colored suspending medium can be prepared by dissolving respectively cobalt naphthenate, manganese naphthenate or nickel naphthenate in trichlorotrifluoroethane or kerosene.

Figure 2:
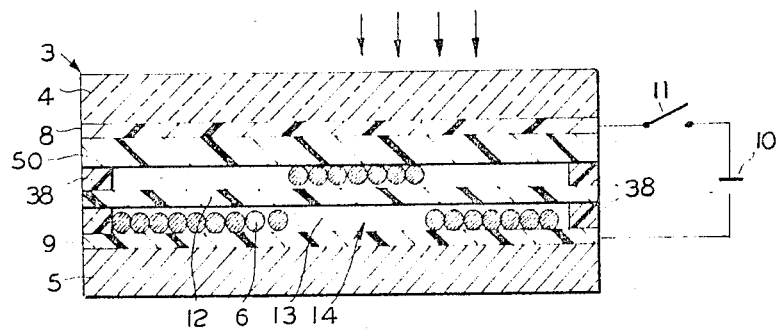

Referring to FIG. 2, wherein similar reference characters designate components similar to those of FIG. 1, an electrophoretic suspension layer 14 includes a dispersion of at least one electrophoretic material 6 suspended in a colorless suspending medium 13 having a colored porous layer 12 inserted therein. In the device of FIG. 2, a color which is a mixture of the colors of the electrophoretic material 6 and the colored porous layer 12 can be seen from the transparent electrode 9 before an effective D.C. electric field is applied across the electrodes 8 and 9. When the colored porous layer 12 is, for example, black, the device shows a gray mixed color of the white material 6 and the black porous layer 12 at the electrode 9 under illumination of white light.

When a D.C. electric field is applied across the both electrodes 8 and 9 with or without irradiation of light on the whole surface of the photoconductive layer 50, the electrophoretic material 6 is caused to pass through the colored porous layer 12 and is deposited on an electrode 9 or on the surface of the photoconductive layer 50, for example, on an electrode 9, depending upon the polarities of the electrophoretic material 6 and applied electric field. Thus, the suspension layer 14 changes in color. When the electrophoretic material 6 deposited on the electrode 9 can hide the colored porous layer 12 from sight, the device of FIG. 2 shows the same color as the electrophoretic material 6 at the electrode 9. A light image is projected on the photoconductive layer 50. A reverse D.C. voltage or an A.C. voltage is applied between the two electrodes 8 and 9 while the photoconductive layer 50 has a reduced resistivity at the light-struck area. The negative image is reproduced at the electrode 9 as shown in FIG. 2. When the polarities of the applied voltages are reversed in the above operation, the positive image is reproduced at the electrode 9. In such a way, the color of the reproduced image can be selected by selecting the polarities of applied voltages. The reproduced image can be erased, for example, by applying a high D.C. or A.C. voltage between said two electrodes 8 and 9.

It is also possible to use an electrophoretic suspension layer having a colored porous layer inserted in a colored suspending medium and at least one electrophoretic material suspended therein. Colored porous layer 12 in the present invention has a different color from that of the electrophoretic material 6 and can be made from any sheet having pores therein. The size of the pores must be large enough to pass the particles of the electrophoretic material therethrough and small enough to hide the electrophoretic material from sight. Operable materials are a cloth or a mesh woven of natural or artificial fibers; a fibroid sheet having thousands of irregular pores; a thin plate with a lot of tiny holes, and a sheet having granular material bound together with resin or an adhesive agent to form a large number of pores.

Figure 3:
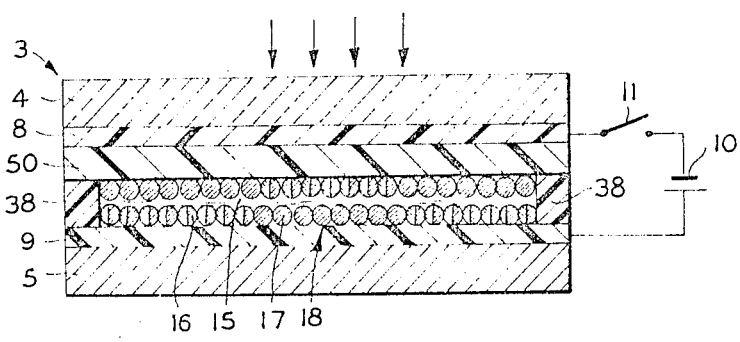

Referring to FIG. 3, wherein similar reference characters designate components similar to those of the foregoing figures, a suspension layer 18 includes a dispersion of at least two kinds of electrophoretic materials 16 and 17 in a finely divided powder form suspended in a suspending medium 15 which is colored or colorless. Said two kinds of electrophoretic materials 16 and 17 are different from each other with respect to the charge polarity and the optical reflective property in said suspending medium 15.

A device of FIG. 3 shows a color which is a mixture of the colors of said two kinds of electrophoretic materials 16 and 17 and suspending medium 15, at the electrode 9, when said electrophoretic materials 16 and 17 are uniformly distributed throughout the suspending medium 15.

When a D.C. electric field is applied across the electrode 8 as an anode and the electrode 9 as a cathode during reduction of resistivity of said photoconductive layer 50 due to the irradiation of light in a similar manner as shown in FIG. 1b, said two kinds of electrophoretic materials 16 and 17 are caused to move electrophoretically in directions opposite to each other. One material, that with positive polarity, moves towards a cathode 9 and is deposited at the cathode 9 and the other, that with negative polarity, moves to and is deposited on the surface of the photoconductive layer 50 and the device shows a different spatial distribution of electrophoretic materials 16 and 17 from the uniform distribution of them. When one of said electrophoretic material 16 with positive polarity is, for example, yellow and the other of said electrophoretic material 17 with negative polarity is, for example, cyan, the device is yellow at the cathode 9.

A light image is projected on the photoconductive layer 50. A reverse D.C. voltage is applied between the electrode 8 as a cathode and the electrode 9 as an anode while the photoconductive layer 50 has a reduced resistivity at the light-struck area. The cyan image on the yellow background is reproduced at the anode 9 as shown in FIG. 3. By reversing the polarities of applied voltages in the above operation, one can obtain a yellow image having a cyan background at the electrode 9. The reproduced image can be erased by applying a D.C. voltage or an A.C. voltage between the two electrodes 8 and 9. In this case, the irradiation of light to the photoconductive layer 50 makes it easy for the reproduced image to be erased as described above. When an A.C. voltage instead of said reverse D.C. voltage is applied between the two electrodes 8 and 9 so as to apply an A.C. field to the double layer having the suspension layer of yellow or cyan and having the photoconductive layer lowered in the electrical resistance at the light-struck area, the reproduced image has a green mixed color of the yellow material 16 and the cyan material 17 on the image area if the suspending medium 15 is colorless and has a yellow or cyan color on the background area where light image is not projected.

Figure 4:
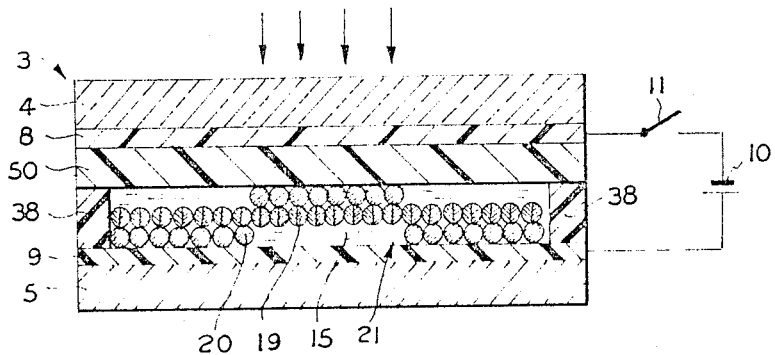

Referring to FIG. 4 wherein similar reference characters designate components similar to those of the foregoing figures, a suspending medium 15 which is colored or colorless includes at least two kinds of electrophoretic materials 19 and 20 in a finely divided powder form. The suspending medium 15 and the materials 19 and 20 together make up the electrophoretic suspension layer 21. Said two kinds of electrophoretic materials 19 and 20 have the same charge polarity but different electrophoretic mobilities and optical reflective properties from each other. A device of FIG. 4 originally shows, at an electrode 9, a color which is a mixture of the colors of said two kinds of electrophoretic materials 19 and 20 suspending medium 15. When said two kinds of electrophoretic materials 19 and 20 are, for example, white and black, respectively and suspending medium 15 is colorless, the device appears gray at the electrode 9. When a D.C. electric field is applied across the electrodes 8 and 9 during reduction of resistivity of said photoconductive layer 50 due to the irradiation of light of a similar manner shown in FIG. 1b, said two kinds of electrophoretic materials 19 and 20 are caused to move electrophoretically toward the same direction.

When the electrophoretic materials 19 and 20 are positively charged and the electrophoretic mobility of said electrophoretic material 19 is greater than that of said electrophoretic material 20, the electrophoretic material 19 moves faster under a D.C. electric field than the electrophoretic material 20 does in said suspendion layer 21; an amount of the former deposited nearest to the cathode 9 is larger than the amount of the latter and the device shows a different spatial distribution of the electrophoretic materials 19 and 20 from the uniform distribution thereof. The device has a white color at the electrode 9. A light image is projected on the photoconductive layer 50. A reverse D.C. voltage or an A.C. voltage is applied between the two electrodes 8 and 9 while the photoconductive layer 50 has a reduced resistivity at the light-struck area, whereby a negative image is reproduced at the electrode 9 as shown in FIG. 4. The positive image can be reproduced by applying firstly a D.C. voltage to the double layer so as to make the color of the suspension layer 21 black at the electrode 9 and by applying secondly a reverse D.C. voltage or an A.C. voltage to the double layer having the electrophoretic suspension layer changed in color at the whole surface and having a photoconductive layer changed in the resistivity at the light-struck area. The reproduced image can be erased by applying a D.C. or A.C. voltage between the two electrodes 8 and 9.

As apparent in the foregoing descriptions and figures, the devices of the present invention described in FIG. 1, 2, 3 and 4 can reproduce a visible image corresponding to light image irradiated on a photoconductive layer. The reproduced image is made up from an electrophoretic suspension layer. The image is reproduced in the following way: A D.C. voltage is applied to the electrophoretic suspension layer so as to change, at the whole surface, the original color of the suspension layer having electrophoretic material distributed uniformly throughout the suspending medium. Light image is projected on the photoconductive layer so as to reduce the resistivity at the light-struck area. A reverse D.C. or A.C. field is applied to the double layer during the reduction of the resistivity of said photoconductive layer at the light-struck area so as to produce an electric field image across said electrophoretic suspension layer changed in color at the whole surface. The electrophoretic material corresponding to the light-struck area is subjected to a strong electric field dependent upon the strength of the light and is caused the electrophoretic transfer, whereby the suspension layer has a spatial distribution of the electrophoretic material in accordance with the light image. The reflective color characteristic of the suspension layer is changed by an electric field applied thereto. This is because a spatial distribution of the electrophoretic material in the suspending medium is changed by application of an electric field and a layer of at least one electrophoretic material deposited on an electrode or a photoconductive layer hides, or is hidden by, the residual colored component in the suspension such as the colored suspending medium, the colored porous layer or the electrophoretic material. Thus, the suspension layer reveals a visible image corresponding to the light image.

Aforesaid electrophoretic suspension layer can be prepared by using any of well known stable colloidal particles suspended in a suspending medium such as colloidal graphite suspended in mineral oil. In addition to colloidal particles, one can use, as an electrophoretic material, finely divided particles such as titanium dioxide, zinc oxide, lithopone, magnesium oxide, carbon black, black iron oxide, phthalocyanine blue, prussian blue, phthalocyanine green, malachite green lake, hansa yellow, bendizine yellow, cadmium yellow, lake red C or watchung red suspended stably in a suspending medium such as kerosene, cyclohexane, trichlorotrifluoroethane, isopropyl alcohol paraffin liquid of olive oil. An electrophoretic material suspended in a suspending medium usually has a positive or negative charge depending upon the properties of the electrophoretic material and the suspending medium.

The electrophoretic suspension layer 2 or 14 of FIG. 1 or 2 can consist of only one electrophoretic material with positive or negative polarity suspended in a suspending medium which is colored or includes a colored porous layer therein. The electrophoretic suspension layer 18 or 21 of FIG. 3 and 4 must include at least two kinds of electrophoretic materials suspended in a suspending medium. Those two kinds of electrophoretic materials must differ from each other in the optical reflective property and further in the charge polarity or in electrophoretic mobility. Therefore, in preparing an electrophoretic suspension layer 18 or 21, at least one pair of electrophoretic materials suitable in the optical reflective property and electrophoretic property must be selectively suspended in a suspending medium.

Average particle sizes of finely divided particles which will be operable are dependent upon the stability and the hiding power of the electrophoretic suspendion layer and usually range from $0.1\mu$ to about $50\mu$.

It is preferred to add any suitable and available charge control agent, dispersion agent or stabilizing agent such as surface active agent, metallic soap, resin or oil to the electrophoretic suspension layer to provide a stable suspension layer and to control electrophoretic property of the electrophoretic material in accordance with the prior art well known in the colloidal chemistry. In order to control the charge property of finely divided particles suspended in a suspending medium, it is preferred to use particles coated with resin which is not soluble in, or only partially soluble in, the suspending medium. When the coated resin is partially soluble in the suspending medium, it can also act as a fixing agent for a reproduced image.

It is possible to use, as a suspending medium, any available and suitable liquid which is inert to the electrophoretic material, the housing, the electrodes and the photoconductive layer. For a purpose to produce a temporary display, one can use a suspending medium in a liquid state at room temperature, i.e., from 0° to 35° C.

For a purpose to produce a permanent display, that is, a hard copy, one can use a suspending medium which is in a solid state at room temperature and in a liquid state above room temperature, i.e., above 35° C. Operable suspending medium for this purpose is, for example, thermoplastic resin or waxes such as beeswax, vegetable wax, paraffin or synthetic wax. When using such suspending media, a device according to the present invention must be treated at higher temperature than room temperature for the display or recording.

After the device is subjected to electric fields and light image at higher temperature to vary electrophoretically the spatial distribution of said electrophoretic material, it is cooled to room temperature, for recording the reproduced image. If it is desired to erase the recorded image, the device is subjected to an A.C. or D.C. electric field at higher temperature. The suspending medium which is originally in a liquid state but can be hardened by, for example, heat, oxidation, UV radiation or reaction with hardner is also useful for producing a hard copy.

For example, when the suspending medium consists of a thermosetting material which is in a liquid state at room temperature, one can produce a permanent display by heating the suspended medium after the electrophoretic movement of the electrophoretic material in an image form.

Operable thermosetting material for use in suspending medium is, for example, drying oil such as linseed oil, soya oil or tung oil. When a liquid suspending medium includes a binder such as polystyrol, vinyl acetate resin or linseed oil which fixes the electrophoretic material in a finely divided powder form, one can obtain a hard copy having a permanently visible image reproduced thereon by evaporating or exhausting the residual liquid suspending medium. The evaporation or exhaustion of the suspending medium can be achieved, for example, evacuating the housing including electrophoretic material in the suspending medium through an outlet formed, for example, in the housing wall.

In the embodiments described above, two electrodes 8 and 9 are positioned at the inner surfaces of housing walls 4 and 5. However, it is possible to realize a display and/or recording device according to the invention by causing the two electrodes positioned at the outer surface of housing walls. In a particular case an electrode opposite to the light source can be replaced by a corona discharge electrode remote from the surface of housing wall.

Figure 5:
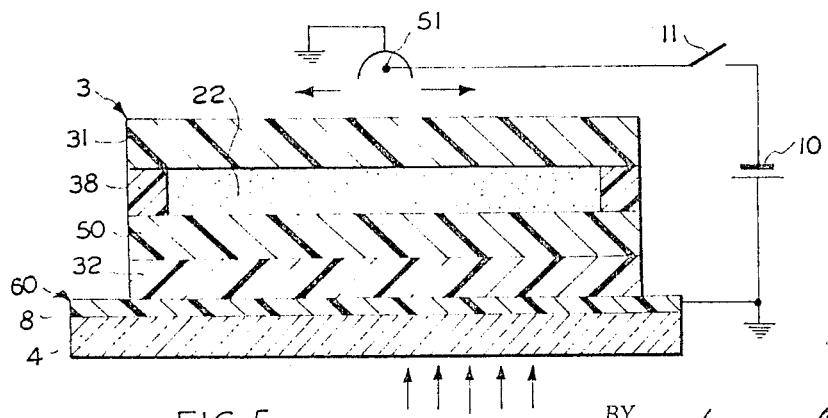

Referring to FIG. 5 in which similar reference characters designate components similar to those of foregoing figures, a suspension layer 22 can be made of any possible electrophoretic suspension layer such as a suspension layer 2, 14, 18 or 21 of FIG. 1, 2, 3 or 4. The suspension layer 22 includes a dispersion of at least one electrophoretic material suspended in a suspending medium and is enclosed in a housing 3. An electrode 60 exposed to light image consists of a plate 4 having an electrode 8 attached thereto and is transparent with respect to the light image and is positioned at the outer surface of the housing wall 32 which is transparent to said light image. The housing wall 32 has a photoconductive layer 50 integrated at the inner surface thereof. Another major housing wall 31 is transparent with respect to visible light. The housing walls 31 and 32 are made from a sheet such as polyester, cellulose diacetate, cellulose triacetate, polyethylene or cellophane.

A high D.C. voltage is applied across the light transparent electrode 60 and a corona discharge electrode 51 remote from the housing wall 31 and capable of scanning over the housing wall 31 so as to charge the surface of the housing wall 31 with corona ions, for example, positive corona ions during the reduction of electrical resistance of said photoconductive layer 50 due to an irradiation of light, whereby the color characteristic of the suspension layer 22 changes at the whole area.

When negative corona ions from the corona discharge electrode 51 are placed on the housing wall 31 while a light image is being projected, through the electrode 60, on the photoconductive layer 50, a visible image is reproduced on the housing wall 31. The reproduced image can be erased while the housing wall 31 is positively or negatively charged by means of a corona discharge electrode 51 during irradiation of light on a whole surface of the photoconductive layer 50.

When the electrophoretic suspension layer 22 is in a solid state at room temperature but can be soft enough for electrophoretic movement of the electrophoretic material above room temperature, it is not always necessary to charge the housing wall 31 while the suspension layer 22 is heated. It is possible to heat the suspension layer 22 so as to cause electrophoretic movement of the electrophoretic material after charging the housing wall 31 with corona ions at room temperature.

The device shown in FIG. 5 can be modified: an electrode 60 can be replaced with another corona discharge means. One of the two corona discharge means discharges positive corona ions on one surface of the housing walls and another of the two corona discharge means discharged negative corona ions on another surface of the housing walls so as to change the color of the suspension layer 22 at the whole surface. A reverse D.C. voltage is applied to the double layer by reversing the polarities of said two corona discharge means while the photoconductive layer 50 has a reduced resistivity at the light image projected area, whereby a visible image is reproduced at the housing wall 31 in a similar manner as described in FIG. 5.

Figure 6:
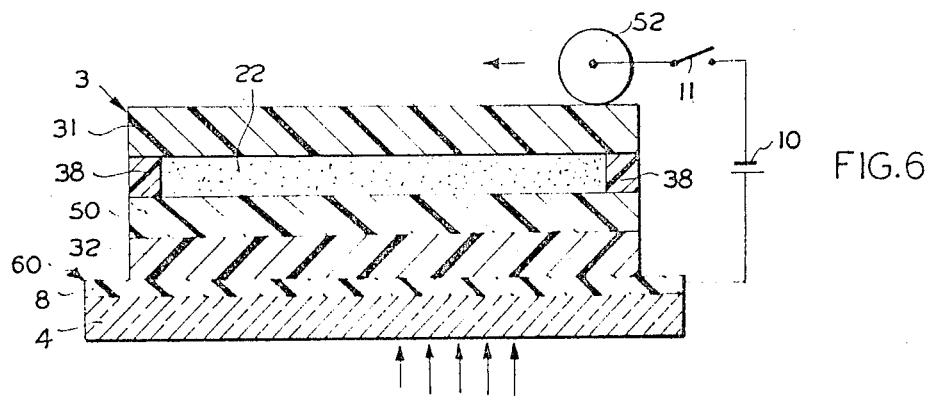

Referring to FIG. 6 in which similar reference characters designate components similar to those of foregoing figures, a roller electrode 52 in a high D.C. voltage rolls along the surface of the housing wall 31 so as to apply a D.C. electric field throughout said electrophoretic suspension layer 22 and said photoconductive layer 50 during the reduction of electrical resistance of said photoconductive layer 50 due to an irradiation of light, whereby the color characteristic of the suspension layer 22 changes. The roller electrode 52 in reverse polarity rolls along the surface of the housing wall 31 so as to apply a reverse electric field throughout said electrophoretic suspension layer 22 changed in color and said photoconductive layer 50 while said photoconductive layer 50 has a reduced resistivity at the light image projected area, whereby a visible image is reproduced on the housing wall 31. The reproduced image can be erased when the roller electrode in a D.C. or A.C. voltage rolls along the surface of the housing wall 31 while light irradiates a whole of the housing wall 32. In FIG. 6, it is possible to replace an electrode 60 with another roller electrode.

When a suspension layer 22 is in a solid state at room temperature and is soft enough to cause the electrophoretic material to move electrophoretically at high temperature, it is not necessary to use a housing 3 for enclosing the suspension layer 22.

Figure 7:
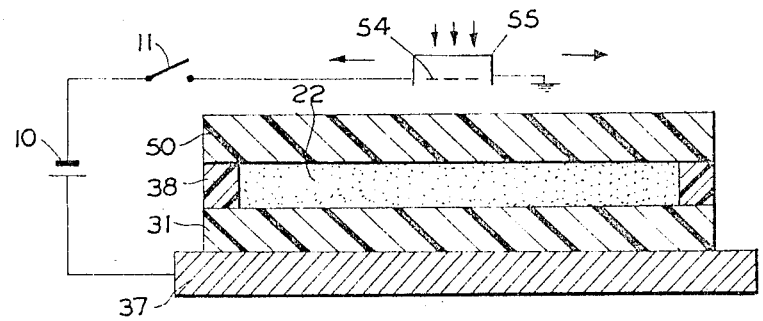

Referring to FIG. 7 in which similar reference characters designate components similar to those of foregoing figures, a visible light transparent sheet 31 has a suspension layer 22 in a solid state at room temperature superposed thereon.

A photoconductive layer 50 is superposed on said suspension layer 22. The three layered sheet is placed on an electrode plate 37 and is charged with corona ions by a corona discharge means 54 capable of scanning over the whole of said photoconductive layer 50 while said three layered sheet is heated, so as to apply an electric field throughout said suspension layer 22 and said photoconductive layer 50. When said three layered sheet is heated, said suspension layer 22 becomes soft enough to allow the electrophoretic material suspended therein to move electrophoretically. Application of corona ions in one polarity from a corona discharge means 54 to said photoconductive layer 50 while said three layered sheet is heated, changes the color of the suspension layer 22. Application of corona ions in another polarity to said photoconductive layer 50 while a light image irradiates said photoconductive layer 50 through a window 55, reproduces a visible image on the sheet 31. The reproduced image can be fixed permanently by cooling the three layered sheet.

Figure 8:
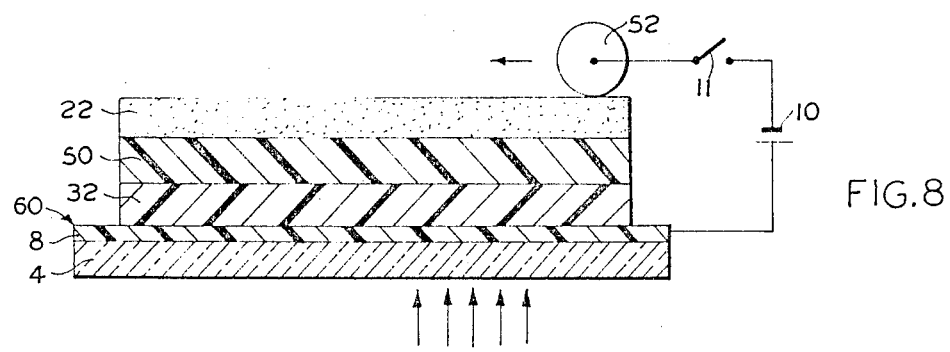

Referring to FIG. 8 in which similar reference characters designate components similar to those of foregoing figures, a light transparent sheet 32 has a photoconductive layer 50 superposed thereon. A suspension layer 22 is superposed on said photoconductive layer 50. A suspension layer 22 is soft enough to cause electrophoretic material to move electrophoretically at room temperature but is hardened above room temperature by heat, or a suspension layer 22 is in solid state at room temperature but can be soft enough, by application of heat or solvent, to cause the electrophoretic material to move electrophoretically. The three layered sheet is placed on a light transparent electrode 60. A roller electrode 52 in a high D.C. voltage rolls along the surface of the suspension layer 22 during the reduction of electrical resistance of said photoconductive layer 50 due to an irradiation of light and during soft state of said electrophoretic suspension layer 22, if necessary, established by application of heat or solvent. A roller electrode 52 in reverse polarity rolls along the surface of the suspension layer 22 while said photoconductive layer 50 is being exposed to a light image through the sheet 32 and said suspension layer 22 is in soft state.

A visible image is reproduced on the suspension layer 22 and can be fixed permanently by heating or cooling the suspension layer 22 or by evaporating the solvent, dependent upon the original property of the suspension layer 22.

In display and/or recording sheets described in FIG. 5, 6, 7 and 8, electrode 37 and 60 can be replaced by a transparent electrode attached to an inner or outer surface of housing wall or sheet 32 in FIG. 5, 6 and 8 or a sheet 31 in FIG. 7.

In the present invention, the photoconductive layer 50 can be transparent with respect to visible light. An operable visible light transparent photoconductor is poly-N-vinylcarbasol and its derivatives. When the photoconductive layer 50, light transparent housing wall 4 and light transparent electrode 8 are all transparent with respect to visible light in the foregoing FIG. 1-4, one can see another visible image at the electrode 8 in addition to one visible image at the electorde 9 which are both reproduced simultaneously in a similar way as described in the foregoing descriptions and figures. The two visible images reproduced simultaneously at both electrodes are different in color. When one is positive image, the other is negative image. In a same way, when the photoconductive layer 50 and housing wall or sheet 32 are transparent with respect to visible light in FIG. 5, 6, or 8, one can see another visible image at the housing wall 32. In such a device including a visible light transparent photoconductive layer, one can prepare a device which displays a visible image through the photoconductive layer only at one side by replacing the housing wall 5 having an electrode 9 thereon with an opaque electrode such as metal plate. A device of this type is shown in FIG. 9.

Figure 9:
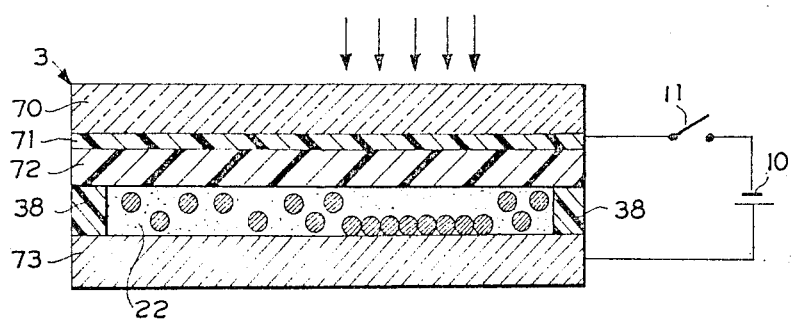

Referring to FIG. 9, wherein similar reference characters designate components similar to those of foregoing figures, a suspension layer 22 is enclosed in a housing 3 having two opposite major housing walls 70 and 73. The housing wall 70 and an electrode 71 attached thereto are transparent with respect to light image and visible light. The electrode 71 has a photoconductive layer 72 attached thereon which is transparent with respect to visible light. Another housing wall 73 is made from, for example, a metal plate. A D.C. voltage is applied between the electrodes 71 and 73 so as to change the color of the suspension layer 22 at the housing wall 70 while said photoconductive layer 72 is being exposed to light at the whole surface. A light image is projected, through the housing wall 70, on the photoconductive layer 72 and a reverse D.C. voltage is applied between the electrodes 71 and 73 while the photoconductive layer 72 has a reduced resistivity at the light-struck area, whereby one can observe a reproduced image at the housing wall 70. The reproduced image can be erased by applying a D.C. or A.C. voltage between the electrode 71 and 73.

One can use any available and possible apparatus as means for applying an electric field throughout a suspension layer and a photoconductive layer between two electrodes. For example, a pulse generator, a battery and any other D.C. or A.C. sources can be used.

The amount of electrophoretic material in a suspending medium or the thickness of the electrophoretic suspension layer is selected depending upon the hiding power or electrophoretic property of the electrophoretic material, the density or contrast range of reproduced image required in the device, feasibility of the voltage source and so on.

Since the display device of the present invention is the reflective type, the suspension layer must be opaque in order to make a great color range. The thicker the suspension layer, the higher the applied voltage which is usually required. The thinner the suspension layer, the denser the concentration of the electrophoretic material must be to make a great color change. The thickness of the suspension layer is usually from a few microns to a few mm. Electrical resistance of the suspension layer is decided depending upon the dark and light electrical resistance of the photoconductive layer. Example A mixture of particles as described in Table 1 is combined with 200 ml of olive oil. The mixture in olive oil is well blended in a ball mill to produce a gray paste having white and black particles suspensed in olive oil. In this gray paste, titanium dioxide particles are positively charged and black toner particles, negatively in olive oil.

Table

Titanium dioxide particles;
 15g (a brand R-680 commercially available from the Ishihara Industrial Company in Japan, of rutile type having a particle sixe of $0.15$–$0.3\mu$)
Black toner particles;
 15g (Type-10 manufactured for electrophotoretography by the Rank Xerox Company in England)

Brominated poly-N-vinylcarbazol as a main photosensitive organic compound, in addition a small amount of sensitizer and plasticizer are dissolved in a solvent to produce photosensitive solution. The solution is coated on the transparent electrode (electrode 8) of EC glass (EC glass is an electrical conductive glass which consists of a transparent glass plate having a transparent $SnO_2$ electrode thereon.) The organic photoconductive layer on the EC glass is about $10\mu$ thick and is transparent with respect to visible light.

Said gray paste is interposed between said photoconductive layer on the electrode 8 and another EC glass electrode (electrode 9) so as to form an electrophoretic suspension layer in thickness of 25μ by using a 25μ thick frame as shown in FIG. 3. The side faces of said sandwich cell are made liquid-tight by adhesive agent (Araldite commercially available from the CIBA Ltd. in Switzerland) while each electrode is being exposed partially for connection of leads.

A D.C. voltage of 300 V is applied for a few seconds between electrode 8 as a cathode and electrode 9 as an anode when light irradiated said organic photoconductive layer.

The sandwich cell appears black at the electrode 9 and appears white at the electrode 8, under illumination of white light. The sandwich cell can memorize the white and black colors at the both electrodes even after removal of applied voltage.

A D.C. voltage of 300 V is applied for 3 seconds between electrode 8 as an anode and electrode 9 as a cathode while black and white positive light image projected through a projector with an incandescent light source is being projected, through electrode 8, on said photoconductive layer, whereby the sandwich cell shows a positive image at the electrode 9 and a negative image at the electrode 8, under illumination of white light. The reproduced images are erased by applying an A.C. voltage of 300 V for a few seconds between the two electrodes while white light is being projected uniformly on the photoconductive layer.

In a similar manner, by projecting a negative light image on the photoconductive layer or by reversing the polarities of applied voltages, the cell reproduces a positive image at the electrode 8 and a negative image at the electrode 9.

In order to see reproduced image at the electrode 9 as a real image in right and left, input light image reversed in right and left must be projected, through electrode 8, on the photoconductive layer.

I claim:

1. An electrophoretic light image reproduction process which comprises applying a D.C. voltage to a double layer of a photoconductive layer and an electrophoretic suspension layer which consists essentially of one member selected from the group consisting of (1) a suspension comprising one electrophoretic material in a finely divided powder from which is dispersed in a suspending medium of a color different from that of said electrophoretic material, (2) a suspension comprising one electrophoretic material in a finely divided powder form dispersed in a suspending medium including a porous layer of a color different from that of said electrophoretic material, said porous layer being substantially parallel to said electrophoretic suspension layer, (3) a suspension having at least two types of electrophoretic materials in a finely divided powder form dispersed in a suspending medium, one of said two types of electrophoretic materials being of a color and charge polarity different from the other, and (4) a suspension having at least two types of electrophoretic materials in a finely divided powder form dispersed in a suspending medium, one of said two types of electrophoretic materials being of a color and electrophoretic mobility different from the other whereby said D.C. voltage changes the optical reflective property of said electrophoretic suspension layer due to electrophoretic movement of said electrophoretic material, exposing said photoconductive layer to a light image so that the light-struck area has a low electrical resistance, and applying an electric voltage capable of reversing the charge on said double layer to said double layer having said electrophoretic suspension layer changed in the optical reflective property and having said photoconductive layer lowered in the electrical resistance at the light-struck area, whereby said electrophoretic material at said light-struck area moves electrophoretically and reproduces said light image on said electrophoretic suspension layer.

2. An electrophoretic light image reproduction process defined in claim 1 wherein said electric voltage is an A.C. voltage 3. An electrophoretic light image reproduction process defined by claim 1 wherein said suspension layer is enclosed in a housing having two opposite housing walls, one of which is transparent with respect to said light image and has said photoconductive layer attached therein, another of which is transparent with respect to visible light.

4. An electrophoretic light image reproduction process defined by claim 1 wherein said suspension layer is enclosed in a housing having two opposite housing walls, one of which is transparent with respect to said light image and visible light and has said photoconductive layer attached thereto which is transparent with respect to visible light.

5. An electrophoretic light image reproduction process defined by claim 3 wherein said housing is interposed between two electrodes at least one of which is in the form of a roller, said D.C. voltage is applied to said double layer by applying a D.C. voltage between said two electrodes while said roller electrode is brought into rolling contact with one of said two opposite housing walls, said electric voltage is applied to said double layer by applying a reverse D.C. voltage between said two electrodes while said roller electrode is brought into rolling contact with said one of two opposite major housing walls.

6. An electrophoretic light image reproduction process defined by claim 3 wherein said one of two opposite major housing walls has a first electrode attached therein which is transparent with respect to said light image, said first electrode has said photoconductive layer attached thereto, said another of two opposite housing walls has a second electrode attached therein which is transparent with respect to visible light, said D.C. voltage is applied between said first electrode and said second electrode so as to apply said D.C. voltage to said double layer, said electric voltage is applied between said first electrode and said second electrode so as to apply said electric field to said double layer.

7. An electrophoretic light image reproduction process defined by claim 3 wherein said housing is interposed between two electrodes at least one of which is a corona discharge electrode, said D.C. voltage is applied to said double layer by applying a D.C. voltage between said two electrodes so as to charge at least one of said two opposite housing walls with corona ions in one polarity from said corona discharge electrode, said electric voltage is applied to said double layer by applying a reverse D.C. voltage between said two electrodes so as to charge said one of two opposite major housing walls with corona ions in another polarity from said corona discharge electrode.

8. An electrophoretic light image reproduction process as claimed in claim 1 wherein said D.C. voltage is applied to said double layer while said photoconductive layer is being uniformly exposed to light over the entire surface thereof.

9. An electrophoretic light image reproduction process as claimed in claim 1 wherein said electric voltage is a D.C. reverse voltage.

10. An electrophoretic light image reproduction process as claimed in claim 1 wherein said suspending medium having a color different from that of said electrophoretic material is a colored suspending medium selected from the group consisting of a colored solution and a colored dispersion having colored neutral particles dispersed in a liquid.

11. An electrophoretic light image reproduction process as claimed in claim 1 wherein said electrophoretic suspension layer consists essentially of a suspension comprising one electrophoretic material in a finely divided powder form dispersed in a suspending medium including a porous layer of a color different from that of said electrophoretic material, said porous layer being parallel to said electrophoretic suspension layer.

12. An electrophoretic light image reproduction process as claimed in claim 1 wherein said electrophoretic suspension layer consists essentially of a suspension having at least two types of electrophoretic materials in a finely divided powder form dispersed in a suspending medium, one of said two types of electrophoretic materials being of a color and charge polarity different from the other.

13. An electrophoretic light image reproduction process as claimed in claim 1 wherein said electrophoretic suspension layer consists essentially of a suspension having at least two types of electrophoretic materials in a finely divided powder form dispersed in a suspending medium, one of said two types of electrophoretic materials being of a color and electrophoretic mobility different from the other.

14. An electrophoretic light image reproduction process as claimed in claim 1 wherein said suspending medium is a material which is hardenable by application of a hardener thereto.

15. An electrophoretic light image reproduction process as claimed in claim 1 wherein said suspending medium consists essentially of a heat hardenable material such as drying oil and thermosetting resin.

16. An electrophoretic light image reproduction process as claimed in claim 1 wherein said suspending medium consists essentially of a heat softenable material such as thermoplastic resin and wax.

17. An electrophoretic light image reproduction process as claimed in claim 1 wherein said reproduced image is erased by applying a D.C. voltage to said double layer while said photoconductive layer is being uniformly exposed to light over the entire surface.

18. An electrophoretic light image reproduction process as claimed in claim 1 wherein said reproduced image is erased by applying an A.C. voltage to said double layer while said photoconductive layer is being uniformly exposed to light over the entire surface.

* * * * *